(12) United States Patent
Gao

(10) Patent No.: US 11,233,404 B1
(45) Date of Patent: Jan. 25, 2022

(54) SYSTEM AND METHODS FOR INTEGRATING MULTIPLE PHOTOVOLTAIC SYSTEMS

(71) Applicant: Baidu USA LLC, Sunnyvale, CA (US)

(72) Inventor: Tianyi Gao, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 0 days.

(21) Appl. No.: 17/153,418

(22) Filed: Jan. 20, 2021

(51) Int. Cl.
*H02J 3/38* (2006.01)
*G06N 3/08* (2006.01)
*H02J 3/32* (2006.01)

(52) U.S. Cl.
CPC ............. *H02J 3/381* (2013.01); *G06N 3/08* (2013.01); *H02J 3/32* (2013.01); *H02J 2300/24* (2020.01)

(58) Field of Classification Search
CPC ...... H02J 3/38; H02J 3/381; H02J 3/32; H02J 2300/24; G06N 3/08
See application file for complete search history.

(56) References Cited

U.S. PATENT DOCUMENTS

2018/0262011 A1\* 9/2018 Itaya .................. H02J 3/383

\* cited by examiner

*Primary Examiner* — Robert L Deberadinis
(74) *Attorney, Agent, or Firm* — Womble Bond Dickinson (US) LLP

(57) ABSTRACT

A method and system of managing power from a number of photovoltaic (PV) energy system includes measuring an output of a subset of PV energy systems, where each of the subset of PV energy systems includes a corresponding current sensor. The remaining PV energy systems do not include current sensors. The method also includes calculating the total power of all of the PV energy systems based on the measured output of the PV energy systems that include sensors. The method also includes determining a charging threshold for one or more storage systems, and determining a power threshold of IT clusters within a data center. The method also includes selectively utilizing energy from the PV energy systems to charge the storage systems or power the IT clusters. The method also includes upgrading and managing the PV system without additional sensors.

20 Claims, 8 Drawing Sheets

SYSTEM AND METHODS FOR INTEGRATING MULTIPLE PHOTOVOLTAIC SYSTEMS

FIELD OF THE DISCLOSURE

Embodiments of the present disclosure relate generally to data center power architecture. More particularly, embodiments of the disclosure relate to systems and methods for providing power to a data center from multiple photovoltaic (PV) sources.

BACKGROUND

Data centers are mission critical facilities which are used for housing IT equipment and servers. The variation in business requirements and use cases, variation in computing power requirements, etc. cause significant variation in IT equipment design. Data centers are expanding very fast, and their total energy consumption is also growing rapidly. Every year, companies with large data centers spend large sums of money on electricity. A need, therefore, exists for systems that can reduce electricity costs and more efficiently utilize power within data centers. Renewable power has started to attract a lot of attention from hyperscale data center owners. In addition, there is indeed a need of implementing renewable energy to accommodate environmental regulations.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
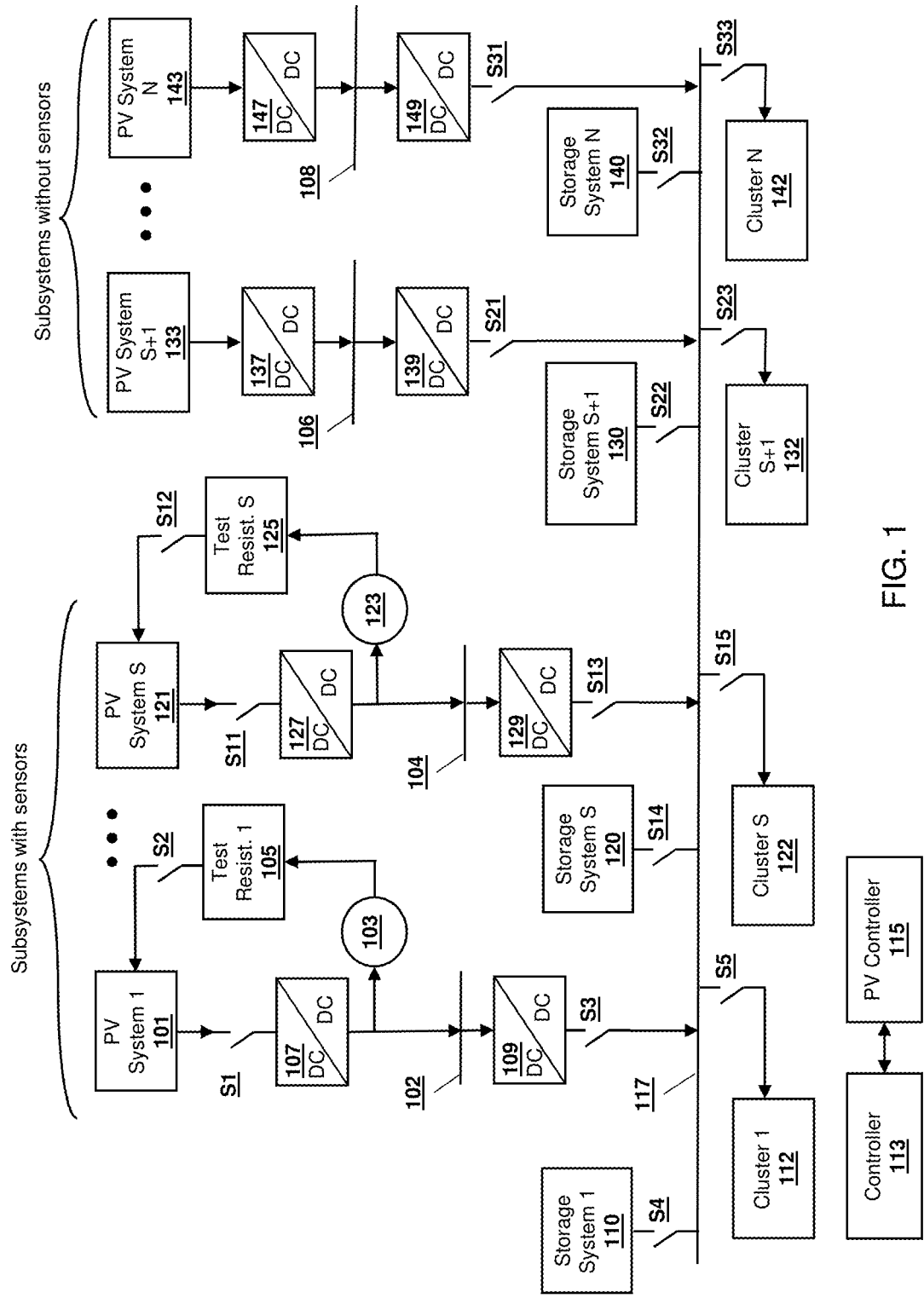
FIG. 1 shows an example design of a power distribution system in a data center, according to an embodiment of the present disclosure.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Green energy systems, like wind turbines and solar panels, are increasingly lower in cost and also low in carbon emissions. However, the power produced by those intermittent resources is at times neither consistent nor predictable. Existing PV systems can be equipped with combined energy storage systems, which may be costly and complex to operate. It is desirable to implement renewable energy to continue supporting the increasing of power need and data center expanding under the environmental regulations and power usage limitations.

Embodiments of the present disclosure allow for integration of new PV systems to existing infrastructure. Instead of using controllers for each subsystem, in some embodiments a single controller can be utilized to control all of the PV subsystems and to add new solar panels to the system.

In an embodiment, not all of the PV systems require a current sensor. Instead of setting up current sensors and a test loop for every PV subsystem, the power levels of newly added PV systems can be predicted based on previously installed PV systems that do include current sensors. In this way, embodiments of the present disclosure provide an advanced solution for upgrading existing PV systems to IT clusters without requiring system adaptations to the existing PV systems or the IT clusters. Such embodiments can also facilitate scaling of PV systems according to the IT load.

Efficiently implementing renewable power systems, such as PV systems, into modern data centers can be challenging. According to an embodiment, the real time solar output power is considered to determine an operation mode for the system, in order to utilize solar power without extra energy storage systems needing to be added to the PV system. According to another embodiment, existing IT infrastructure can be upgraded to include a PV system without additional requirements on detection or control systems. Embodiments of the present disclosure provide a system that can be easily plugged into an existing infrastructure, and is fully compatible with an existing PV system and IT cluster. In addition, newly added PV systems, as well as the entire system, can be operated in multiple stages based on the newly upgraded capabilities. In some embodiments, the PV systems real time power output can be dynamically adjusted in multiple scenarios, including PV system upgrading, PV system degrading, PV system failure, regular maintenance, and so on.

According to one embodiment, the design and operation of a multi-PV system is disclosed. An example system design is disclosed, as well as the control flow for populating and operating a PV system, and utilizing the available renewable power efficiently. For ease of description, high level embodiments of the multiple systems are provided, including the electrical system architecture, and including the electrical connections among subsystems and the whole system. However, one skilled in the art will recognize that these embodiments do not limit the scope of the invention, and various other embodiments, architectures, and designs can be used.

In an embodiment, the system disclosed herein can operate in at least three modes of operation, including a disconnection mode, a connection mode, and a battery charging mode. To enable integration of new PV systems to upgrade existing systems, and to operation the renewable energy sources more efficiently to power data centers, a mathematical approach is disclosed below to enable a detection and estimation of solar power from an upgrade system, including operation of each individual newly added subsystem. Embodiments disclosed herein can enable the upgrading of renewable power systems in a simplified and cost effective means. The techniques disclosed herein can be used, for example, to integrate an existing architecture with additional PV systems, including PV systems that may or may not be equipped with battery storage systems.

FIG. 1 shows an example design of a power distribution system in a data center, according to an embodiment of the present disclosure. In this embodiment, there are N PV subsystems in total, some of which include current sensors and some of which do not. In this embodiment, the system includes S number of subsystems with current sensors, and N-s number of subsystems without current sensors. Specifically, the system includes a first PV system 101 with a corresponding DC/DC converter 107, a current sensor 103, and a first test resistance 105. The DC/DC converter 107 and first test resistance 105 are selectively connected to the first PV system 101 using switches S1 and S2, in this example embodiment. Likewise, PV system S 121 is selectively connected to a DC/DC converter 127 and test resistance S 125 using switches S11 and S12. Current sensor S 123 is also located between the DC/DC converter 127 and test resistance S 125. In this embodiment, the DC/DC converters 107, 127, 137, 147 are used to normalize and regulate the output voltage of each PV system to a certain level for use (e.g. for charging batteries or powering other workloads).

In this embodiment, there are a total of N PV systems and N-s subsystems do not include current sensors. The N-s PV systems incudes PV system S+1 133 and PV system N 143. PV system S+1 133 is connected to DC/DC converter 137, and PV system N 143 is connected to DC/DC converter 147. In an embodiment, each of the DC/DC converter 107, 127, 137, 147 is connected to a DC bus 102, 104, 106, 108. In some embodiments, the DC buses 102, 104, 106, 108 may be the same DC bus.

In the embodiment of FIG. 1, each of the PV systems is selectively connected to a DC inter-system DC bus 117 via DC/DC converters 109, 129, 139, 149 and switches S3, S13, S21, S31. The DC/DC converters 109, 129, 139, 149 are used to convert the voltage to the same as that of the inter-system DC bus 117.

Each PV system includes a corresponding storage system, in this embodiment. In some embodiments, the PV systems can coexist with a more centralized storage system for powering the DC bus. These storage systems corresponding to each PV system include storage system 1 110, storage system S 120, storage system S+1 130, and storage system N 140. Each of these storage systems are selectively connected to the inter-system DC bus 117 using switches S4, S14, S22, and S32. In some embodiments, each of the S+1 through N PV systems may not need its own dedicated storage system, and two or more of the PV systems can share a storage system.

In the embodiment of FIG. 1, N clusters are also selectively connected to the inter-system DC bus 117. These clusters include cluster 1 112, cluster S 122, cluster S+1 132, and cluster N 142, which are selectively connected to the inter-system DC bus 117 using switches S5, S15, S23, S33. In an embodiment, the system also includes a central controller 113 and a PV controller 115. The PV controller 115 can monitor readings from the current sensors 103 and 123, and can operate the PV system switches S1, S2, S11, and S12. Controller 113 can be used to operate switches S3, S4, S5, S13, S14, S15, S21, S22, S23, S31, S32, and S33 in some embodiments, and can interact with the PV controller 115. As will be appreciated, the controller 113 and PV controller 115 can be separate elements or can be integrated into a single controller in some embodiments.

Whenever a subsystem has solar power available, the PV resources can be connected to the inter-system DC bus 117 and can be used to serve the clusters 112, 122, 132, 142, or to charge the storage systems 110, 120, 130, 140. The switches in this embodiment have at least two goals: system operation for operating power flow for powering the data center IT clusters, and to enable modular system design and service/maintenance considerations.

Example operating scenarios include the following: For newly built systems, subsystems 1 through S can be integrated first, and then systems S+1 through N can be integrated. For existing systems having PV systems S+1 through N, these systems may be equipped with energy storage systems or batteries, and then systems 1 through S can be integrated so that overall control can be switched to these systems with sensors. For existing systems including PV systems 1 through N, subsystems 1 through S can be integrated or retrofitted to implement the operating strategy and control techniques described herein.

Figure 2:
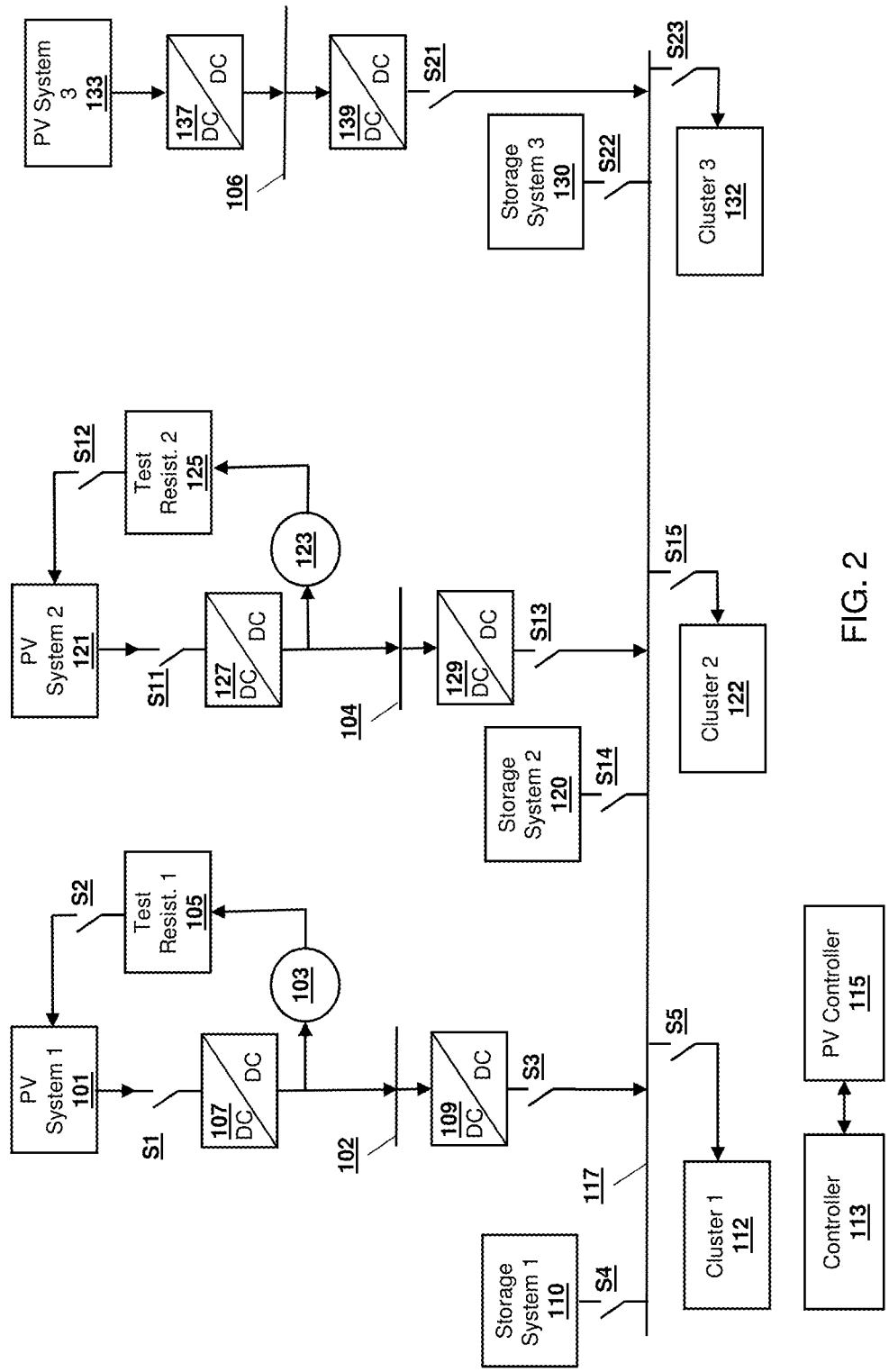
FIG. 2 shows another example design of a power distribution system in a data center, according to an embodiment of the present disclosure.

FIG. 2 shows another example design of a power distribution system in a data center, according to an embodiment of the present disclosure. In this embodiment, the system includes three PV subsystems. The first PV system 101 and the second PV system 121 are connected to current sensors 103 and 123, respectively. The first PV system 101 is selectively connected to DC/DC converter 107 using switch S1, and is selectively connected to the first test resistance 105 using switch S2. Likewise, the second PV system 121 is selectively connected to DC/DC converter 127 using switch S11, and is selectively connected to the second test resistance 125 using switch S12. The system also includes PV system 3 133 that is connected to DC/DC converter 137 without any current sensors. Each of the DC/DC converters 107, 127, 137 is connected to a DC bus 102, 104, 106. This means this system 133 will be operated based on the other two PV system sensors.

In the embodiment of FIG. 2, each of the PV systems is selectively connected to a DC inter-system DC bus 117 via DC/DC converters 109, 129, 139 and switches S3, S13, S21. The DC/DC converters 109, 129, 139 are used to convert the voltage to the same as that of the inter-system DC bus 117.

Each PV system coexist with a corresponding storage system, in this embodiment. These storage systems include storage system 1 110, storage system 2 120, and storage system 3 130. Each of these storage systems is selectively connected to the inter-system DC bus 117 using switches S4, S14, and S22. In an embodiment, this storage system can be either a dedicated energy backup unit in the data center or an existing one used in the utility power line.

In the embodiment of FIG. 2, three clusters are also selectively connected to the inter-system DC bus 117. These clusters include cluster 1 112, cluster 2 122, and cluster 3

132, which are selectively connected to the inter-system DC bus 117 using switches S5, S15, S23. In an embodiment, the system also includes a central controller 113 and PV controller 115. The PV controller 115 can monitor readings from the current sensors 103 and 123, and can operate the PV system switches S1, S2, S11, and S12. Controller 113 can be used to operate switches S3, S4, S5, S13, S14, S15, S21, S22, and S23 in some embodiments, and can interact with the PV controller 115. As will be appreciated, the central controller 113 and PV controller 115 can be separate elements or can be integrated into a single controller in some embodiments.

Figure 3:
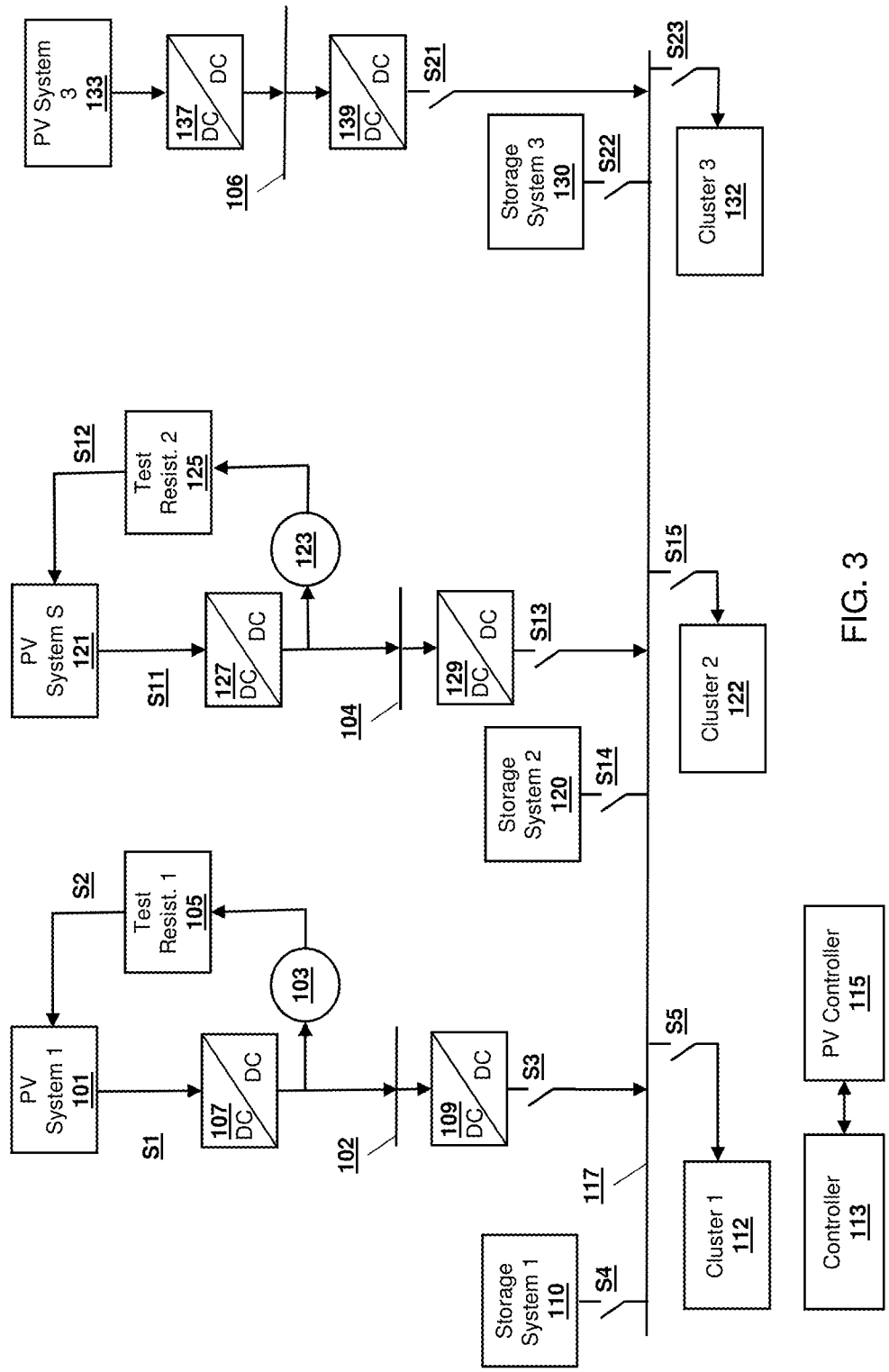
FIG. 3 shows another example design of a power distribution system in a data center, according to an embodiment of the present disclosure.

Three example operation modes of this system are described below and illustrated in FIGS. 3-5. FIG. 3 shows an example design of the power distribution system of FIG. 2 in a disconnection mode, according to an embodiment of the present disclosure. In this mode of operation, the central controller 113 sends a signal to the PV controller 115, and the PV controller 115 retrieves the current data from the sensors 103, 123 and finds that there is no solar power available at the present time. This information is then relayed back to the central controller 113. Thus, switches S3, S4, S5, S13, S14, S15, S21, S22, and S23 remain open wile switches S1, S2, S11, and S12 are closed.

Figure 4:
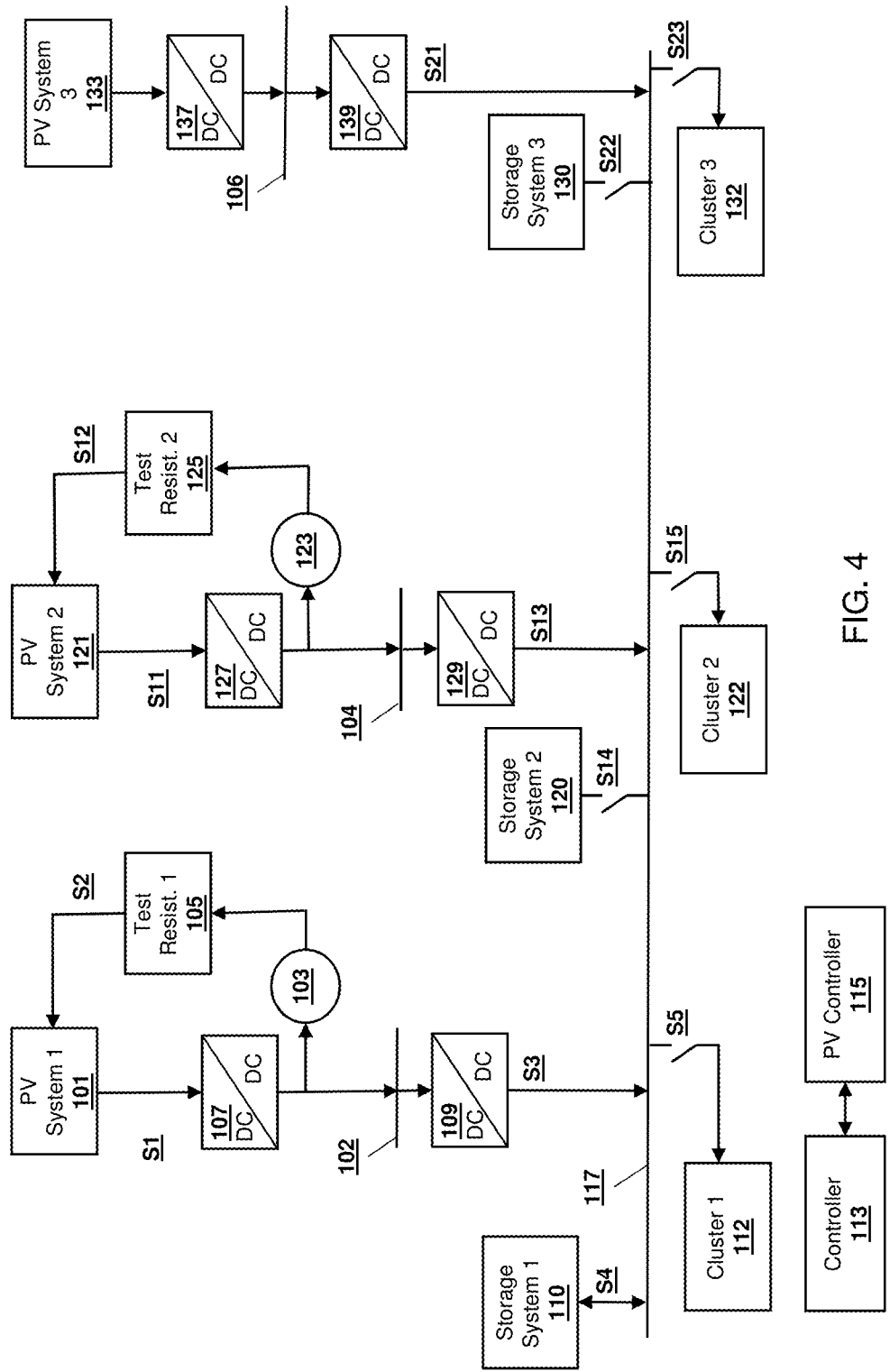
FIG. 4 shows another example design of a power distribution system in a data center, according to an embodiment of the present disclosure.

FIG. 4 shows an example design of the power distribution system of FIG. 2 in a battery charging mode, according to an embodiment of the present disclosure. In this mode of operation, the central controller 113 sends a signal to the PV controller 115, and the PV controller 115 retrieves the current data from sensors 103, 123 and finds that there is solar power at present that can be used to charge the storage systems. This information is relayed to the central controller 113, which determines that the first storage system 110 will receive the available solar power. In this mode of operation, switches S5, S15, and S23 are open and switches S3, S13, and S21 are closed to connect all of the PV systems to the inter-system DC bus 117. One or more of switches S4, S14, and S22 are closed to charge one or more of the subsystems. In this example embodiment, S4 is closed to charge the first storage system 110, while S14 and S22 are open. In some embodiments, the storage system to be charged can be chosen by considering the state of the battery and the state of the components within the subsystem. In this embodiment, the detection circuit remains a closed circuit with switches S1, S2, S11, and S12 closed.

Figure 5:
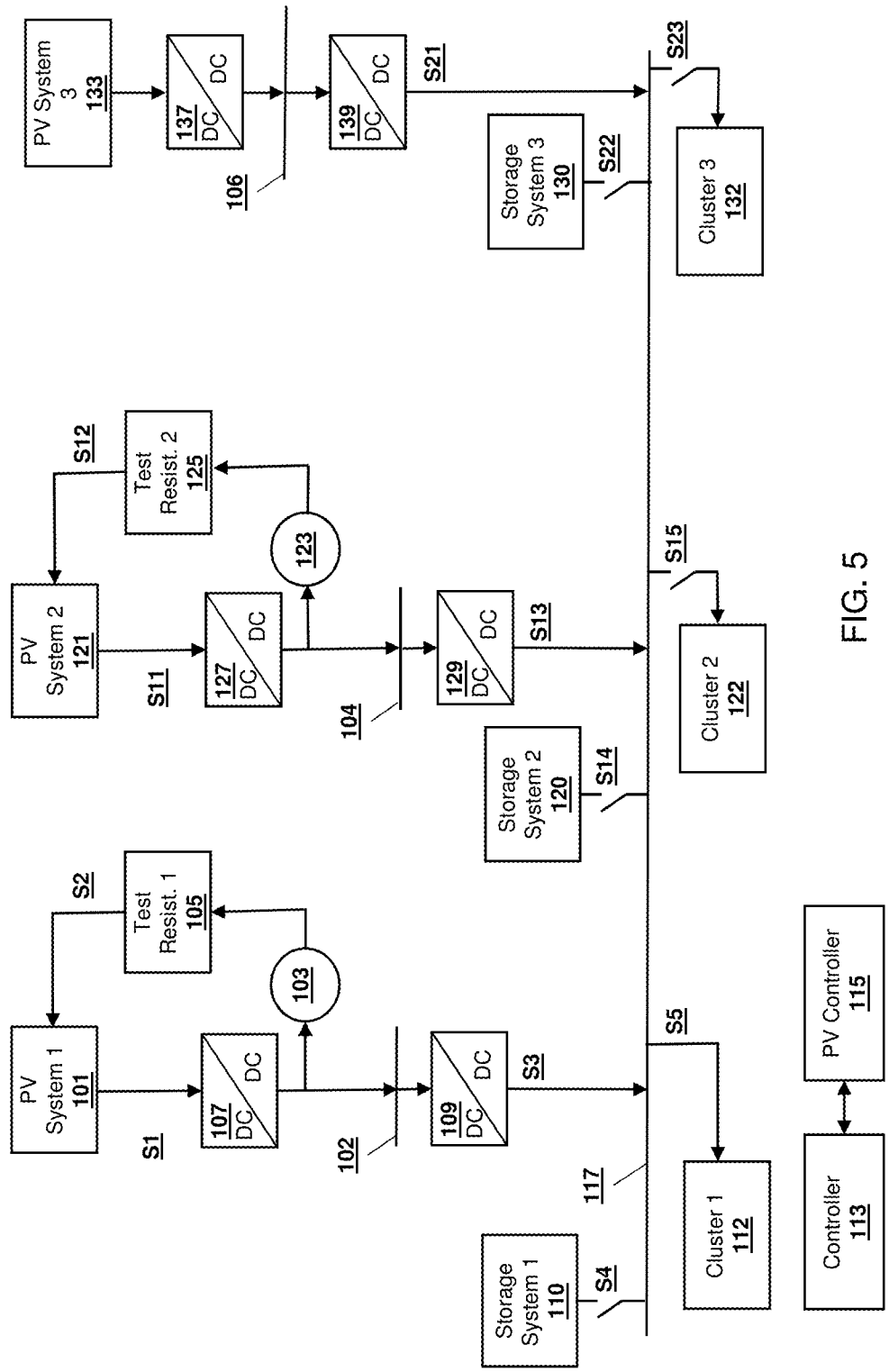
FIG. 5 shows another example design of a power distribution system in a data center, according to an embodiment of the present disclosure.

FIG. 5 shows an example design of the power distribution system of FIG. 2 in a connection mode, according to an embodiment of the present disclosure. In this mode of operation, the PV controller 115 retrieves current data from the sensors 103, 123 and determines that there is sufficient solar power available. Thus, switches S3, S13, and S21 are closed to connect all of the PV systems to the inter-system DC bus 117. However, in this embodiment the total solar power exceeds the bus connection threshold, so switches S4, S14, and S22 are open and S1, S2, S11, S12 are closed along with S3, S13, and S21 to provide the solar power to one of the clusters. In this embodiment, the first cluster 112 is connected to the inter-system DC bus 117 using switch S5, while the second cluster 122 and third cluster 132 remain disconnected with switches S15 and S23 open.

Figure 6:
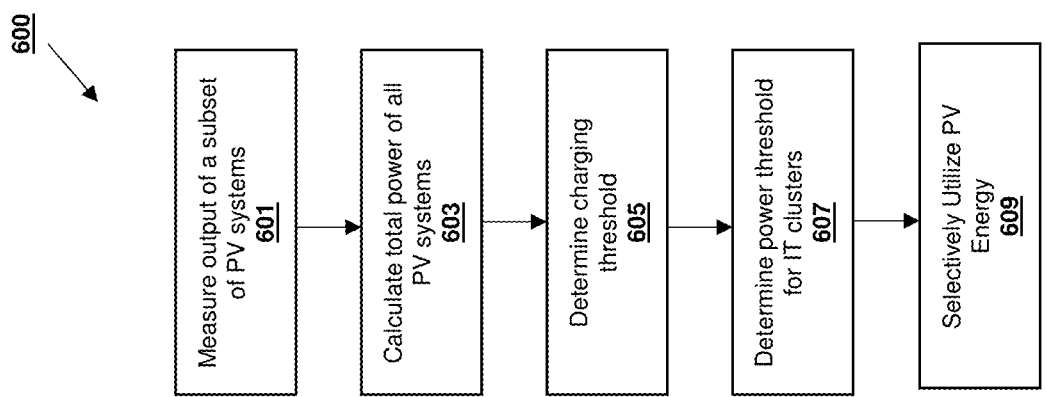
FIG. 6 is a flow diagram of an example method for distributing power within a data center, according to an embodiment of the present disclosure.

FIG. 6 is a flow diagram of an example method for distributing power within a data center, according to an embodiment of the present disclosure. The power distribution method 600 can be implemented, for example, using the power distribution systems described in FIGS. 1-5. At operation 601, the method 600 measures an output of a subset of PV energy systems which include current sensors. Within the data center, the remaining PV energy systems do not include current sensors.

At operation 603, the total power of all of the PV energy systems is calculated based on the measured output of the subset of PV energy systems. In some embodiments, where the PV energy systems without current sensors include the same type of PV cell as the PV energy systems with sensors, the total power can be calculated by applying a power level of each of the PV systems with sensors to those without sensors.

In some embodiments, where the PV systems without sensors are not the same type as those with sensors, the total power can be calculated by multiplying by a ratio proportional to the number of panels of the sensor-less PV systems divided by the number of panels in the PV systems with sensors. Weights can be randomly selected for each of the PV systems without sensors, in some embodiments. The highest and lowest values from the randomly selected weights can be removed, and an average value can be calculated for the remaining power levels.

In operation 605, a charging level threshold for the storage systems is determined. In operation 607, a power threshold for the IT clusters within the data center is determined.

In operation 605, energy from the PV energy systems is selectively used to charge the storage systems or the IT clusters. In some embodiments, when the total PV power is higher than the charging level threshold for the storage systems but below the power threshold for the IT clusters, the PV power can be used to charge the storage systems. If the total PV power is above the power threshold for the IT clusters, the PV power can be used to power one or more of the IT clusters.

Figure 7:
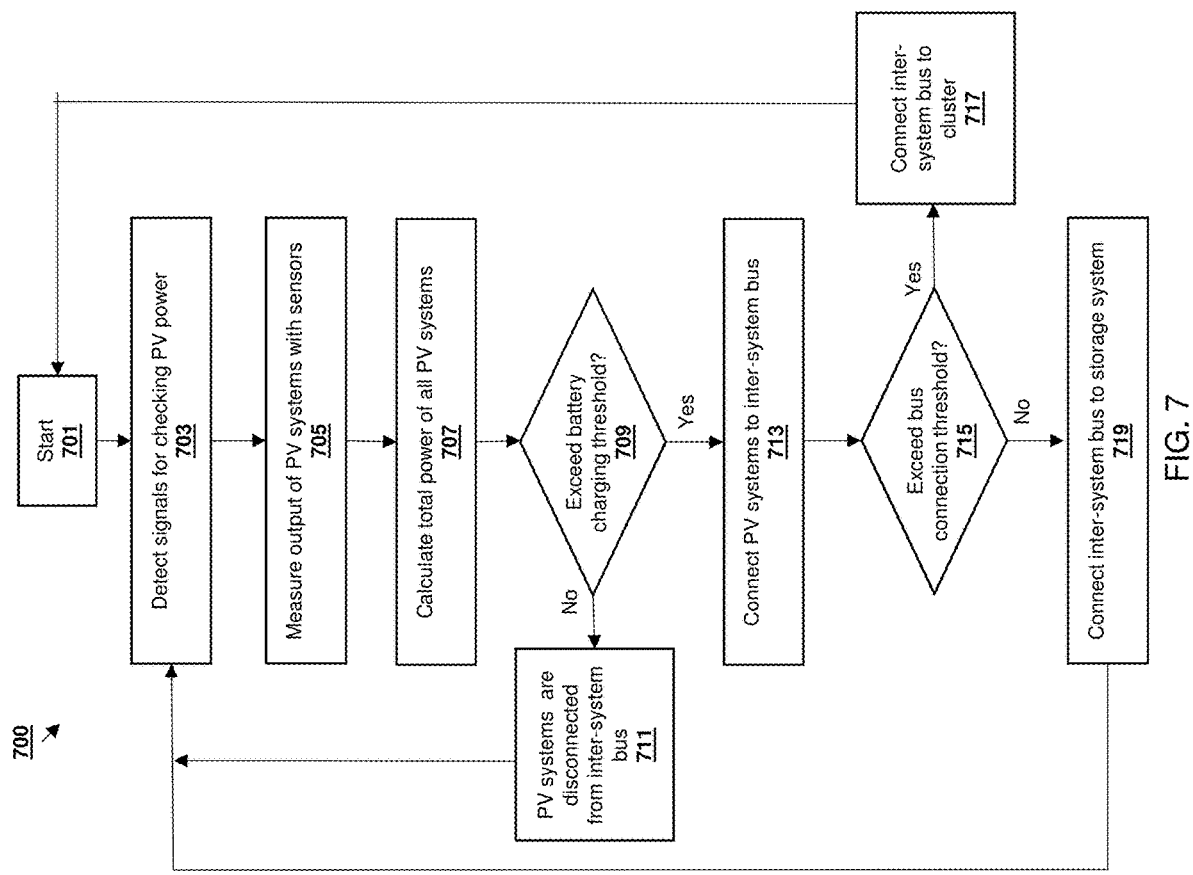
FIG. 7 is a flow diagram of another example method for distributing power within a data center, according to an embodiment of the present disclosure.

FIG. 7 is a flow diagram of another example method 700 for distributing power within a data center, according to an embodiment of the present disclosure. The power distribution method 700 can be implemented, for example, using the power distribution systems described in FIGS. 1-5. In this embodiment, two thresholds are used in the control logic: the charging level threshold, and the bus connection threshold (i.e. the power threshold for the IT clusters).

The method 700 begins at 701 in an initial state of operation. With reference to the systems described in FIGS. 2-5, all the switches are open in this initial state except for switches S2 and S12.

At operation 703, the method 700 detects signals for checking whether there is any available PV power. If a signal exits, the information of the output current of the PV systems is measured at operation 705. The current can be measured by closing switches S2 and S12, opening all other switches, and having the PV controller measures the values at current sensors 103 and 123.

At operation 707, the total amount of solar power of the whole system is calculated. In an embodiment, the total power can be calculated according to the equations below, where $P_{total}$ stands for the total solar power of the whole system at present, and the first term corresponds to the solar power of the subsystems which have current sensors, this means the output of these subsystems are measurable directly.

$$P_{total} = \sum_{t=1}^{s} W(I_t) + \sum_{k=s+1}^{n} \sum_{t=1}^{s} \varphi_t W(I_t) f(\alpha_{kt}) \quad (1)$$

$$\text{Subject to } \sum_{t=1}^{s} \varphi_t = 1 \quad (2)$$

$$W(I_t) = \delta I_t \quad (3)$$

$$f(\alpha_{kt}) = \alpha_P \frac{P_k}{P_t} \text{ or } f(\alpha_{kt}) = \alpha_N \frac{N_k}{N_t} \quad (4)$$

In equations (1) and (3), W(I) is the function which can transfer current to power for the subsystem, and I is the current that is measured from the sensor. In equation (3), $\delta$ is proportional to the output voltage value of the PV panel in the certain subsystem. In an embodiment, $\delta$ needs to be tuned for different systems, since the $\delta$ is based on both the detection circuit including the test resistance as well as the PV system itself. The function $f(\alpha_{kt})$ is a transfer function which can be used to calculate the solar power output of other subsystems which do not have sensors, and is proportional to the deviation of $P_k$ and $P_t$, where $P_k$ is the rated power of the subsystem that does not have any sensors, and $P_t$ is the power of the subsystem that has a sensor. When the subsystems which have sensors are the same as, or made by the same company as those without sensors, only a number of panels is involved in the transfer function. This transfer function can be understood as representing the output power relationships of two systems under the same environment. Therefore, with one system measured, the other one can be calculated. This transfer function also can be developed or tuned based on the actual system. Here we introduce some of the methods which may be used in the following sections.

In equation (4), $\alpha_P$ is a constant factor and it can be treated as 1 as a default. In an embodiment, $N_1$ and $N_3$ correspond to the numbers of panels of PV system 1 and 3, respectively, while $\alpha_N$ is a constant factor which can be set as a default to 1. Constants $\alpha_P$ and $\alpha_N$ can be adjusted in order to tune the accuracy of the system.

In equations (1) and (2), $\varphi_t$ is used as the weight of each subsystem t, while the sum of weights adds up to one and the weight can be calculated using a randomized algorithm. The output solar power of one subsystem which does not have sensors can be calculated as a weighted sum of the solar power produced by the subsystems that have sensors, in some embodiments.

The transfer function is proportional to the power generation abilities of the solar panels, which can be related to the materials, number of panels, etc. Considering the differences of the PV panels in those subsystems, three conditions are outlined above in equations (2) through (4).

At operation 709, it is determined whether the total power exceeds the battery charging threshold. If not, the PV systems are disconnected, or are kept disconnected, from the inter-system DC bus in operation 711. In operation 711, if the PV systems are initially connected to the inter-system bus they can be disconnected, and if they are not connected they remain disconnected. This can be performed in the disconnected operating mode shown in FIG. 3, for example.

If the total power does exceed the battery charging threshold, the PV systems can be connected to the inter-system DC bus at operation 713. This may be performed by closing switches S1, S2, S3, S11, S12, S13, and S21 so that the power from the PV systems can be directed to the inter-system DC bus 117.

At operation 715, it is determined whether the total PV power exceeds the bus connection threshold for the IT clusters. If not, the inter-system bus is connected, at operation 719, to one or more of the storage systems to charge the storage systems using PV power. An example of this mode of operation is described above in reference to FIG. 4.

If the total PV power exceeds the bus connection threshold, then one or more of the clusters are connected to the inter-system bus to power the cluster using PV power at operation 717. An example of this mode of operation is described above in reference to FIG. 5.

Figure 8:
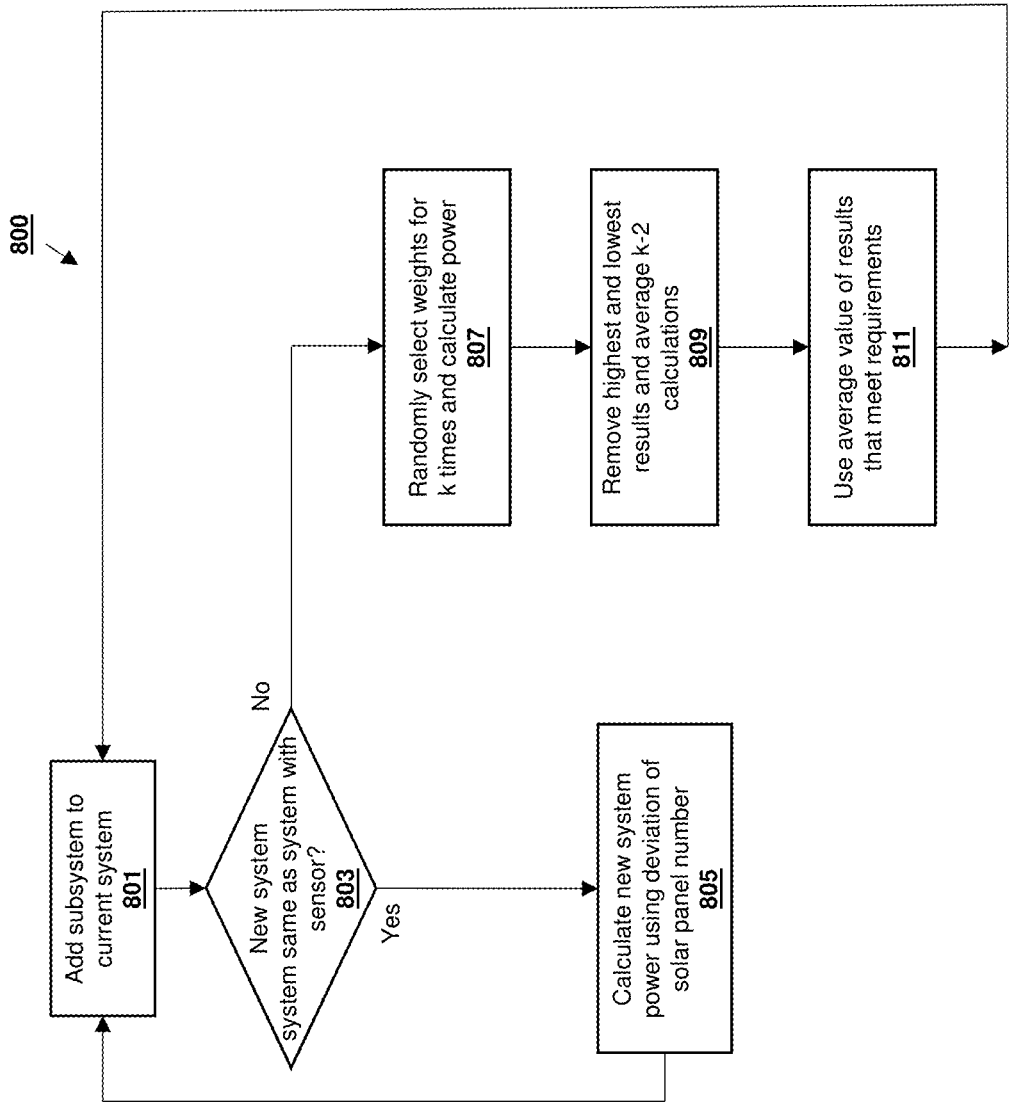
FIG. 8 is a flow diagram of an example method for integrating photovoltaic (PV) power systems within a data center, according to an embodiment of the present disclosure.

FIG. 8 is a flow diagram of an example method 800 for integrating PV power systems within a data center, according to an embodiment of the present disclosure. The method 800 can be implemented, for example, using the power distribution system described in FIGS. 1-7. At operation 801, one or more new PV subsystems that do not include any current sensors are added to a current PV energy system.

At operation 803, the method 800 determines whether the one or more new PV systems are the same type of system as the current PV systems that have sensors. If it is the same type of PV system (e.g. the same type of solar panels or from the same manufacturer), then the method 800 continues to operation 805 and the power of the new PV system is calculated using a deviation of the number of solar panels. The power of the new PV system can be calculated directly, simply based on the number of panels included in the new PV system, or by multiplying a ratio that is proportional to the number of new solar panels divided by the number of previous solar panels that have sensors.

If it is determined at operation 803 that the new PV system is not the same type as the current PV systems that include sensors, the method 800 continues with operation 807 and randomly selects weights for k times, where k is the number of new PV systems being added, and calculates the power for those weights.

At operation 809, the highest and lowest results for each of the randomly selected weights is removed, and the average of the k-2 calculations is generated. At operation 811, the average value of the results which meet system requirements is calculated in order to determine the output power of the new subsystem. For example, results that meet system requirements may include results that have larger difference from the mean value of the entire set of results. In an embodiment where there are two or more identical highest or lowest results, each of those results would not meet system requirements.

In some embodiments, the methods described herein can be used implemented using an artificial intelligence (AI) and/or machine learning (ML) neural network that is trained to determine or calculate the predicted output power of a new subsystem. For example, the measured values for the PV systems that include sensors, and the weighted power values calculated for the new PV systems (as well as the averaged calculations described above) can be used to train a neural network that can calculate the estimated power produced by new PV systems that do not include sensors, as well as the total power of the PV systems. As another example, the $\delta$ shown in the equations above and the transferred functions can be achieved with AI techniques.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

One skilled in the art would recognize that various adjustments can be made to the system within the scope of this disclosure.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a method of managing power from a plurality of photovoltaic (PV) energy systems. The method includes measuring an output of a subset of PV energy systems, where each of the subset of PV energy systems includes a corresponding current sensor, and the remainder of the PV energy systems do not have current sensors. The method also includes calculating a total power of all of the PV energy systems based on the measured output of the PV energy systems with sensors. The method also includes determining a charging threshold for one or more storage systems, and determining a power threshold of one or more IT clusters within a data center. The method also includes selectively utilizing energy from the PV energy systems to charge the storage systems or power the IT clusters. In one embodiment, the PV energy systems without current sensors include the same type of PV cell as the PV energy systems with sensors, and calculating the total power includes applying a power level of each of the PV energy systems with sensors to each of the PV energy systems without sensors. In one embodiment, the PV energy systems without current sensors include a same type of PV cell as the subset of PV energy systems, and calculating the total power includes multiplying by a ratio which is proportional to a number of panels of the PV energy systems without current sensors divided by a number of panels of the subset of PV energy systems. In one embodiment, calculating the total power includes calculating power levels for each of the PV energy systems without current sensors by numerically selecting weights for each of the PV energy systems without current sensors. In one embodiment, calculating the total power also includes: removing power level calculations corresponding to highest and lowest values from each of the weights for the PV energy systems without current sensors; and calculating an average value of the remaining power level calculations. In one embodiment, calculating the total power includes: utilizing a machine learning (ML) neural network to calculate a predicted output power of the PV energy systems without current sensors; and calculating the total power based on the predicted output power calculated using the ML neural network. In one embodiment, the total power is above the charging threshold for one or more storage systems and below the power threshold of one or more IT clusters, and energy from the plurality of PV energy systems is used to charge the one or more storage systems. In one embodiment, the total power is above the charging threshold for one or more storage systems and above the power threshold of one or more IT clusters, and energy from the plurality of PV energy systems is used to power the one or more IT clusters.

Another embodiment of the present disclosure includes a data center. The data center includes a number of PV energy systems, a subset of PV energy systems including current sensors, and a remainder of the PV energy systems without current sensors. The data center also includes one or more storage systems, one or more IT clusters, and at least one power controller. The power controller is configured to measure an output of the PV energy systems with current sensors; and calculate a total power of all of the PV energy systems based on the measured output of the PV energy systems with sensors. The power controller is also configured to determine a charging threshold for the one or more storage systems, and determining a power threshold of the one or more IT clusters. The power controller is also configured to selectively utilize energy from the PV energy systems to charge the storage systems or power the IT clusters. In one embodiment, the PV energy systems without current sensors include the same type of PV cell as the PV energy systems with sensors, and the power controller is configured to calculate the total power by applying a power level of each of the PV energy systems with sensors to each of the PV energy systems without current sensors. In one embodiment, the PV energy systems without current sensors include the same type of PV cell as the PV energy systems with current sensors, and the power controller is configured to calculate the total power by multiplying by a ratio which is proportional to a number of panels of the PV systems without current sensors divided by a number of panels of the PV energy systems with current sensors. In one embodiment, the power controller is also configured to: receive one or more additional PV energy systems without current sensors; and manage and operate all the PV energy systems in different modes of operations, the modes of operation including a disconnected mode, a charging mode for charging the one or more storage systems, and a connected mode for powering the one or more IT clusters. In one embodiment, calculating the total power includes: utilizing a machine learning (ML) neural network to calculate a predicted output power of the PV energy systems without current sensors; and calculating the total power based on the predicted output power calculated using the ML neural network. In one embodiment, the total power is above the charging threshold for one or more storage systems and below the power threshold of one or more IT clusters, and energy from the plurality of PV energy systems is used to charge the storage systems. In one embodiment, the total power is above the charging threshold for one or more storage systems and above the power threshold of one or more IT clusters, and energy from the plurality of PV energy systems is used to power the IT clusters.

Another embodiment of the present disclosure includes a method for integrating photovoltaic (PV) power systems within a data center. The method includes adding at least one new PV energy system that does not include a current sensor to the data center. The method also includes determining whether the new PV energy system includes the same type of PV cell as previously installed PV energy systems. If the new PV energy system includes the same type of PV cell as the previously installed PV energy systems, the method includes calculating a total power of all PV energy systems by applying a power level of each of the previously installed PV energy systems to each of the new PV energy systems. If the new PV energy system does not include the same type of PV cell as the previously installed PV energy systems, the method includes calculating the total power of all PV energy systems by multiplying by a ratio which is proportional to a number of panels of the new PV energy systems divided by a number of panels of the previously installed PV energy systems. In one embodiment, the new PV energy system does not include the same type of PV cell as the previously installed energy systems, and calculating the total power includes: calculating power levels for each of the new PV systems without current sensors by numerically selecting weights for each of the new PV systems without current sensors. In one embodiment, calculating the total power further includes: removing power level calculations corresponding to highest and lowest values from each of the numerically selected weights for each of the new PV systems; and calculating an average value of remaining power level calculations. In one embodiment, the total power is above a charging threshold for one or more storage systems and below a power threshold of one or more IT clusters, and energy from the all PV energy systems is used to charge the storage systems. In one embodiment, the total power is above a charging threshold for one or more storage systems and above a power threshold of one or more IT clusters, and energy from all PV energy systems is used to power the IT clusters.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A method of managing power from a plurality of photovoltaic (PV) energy systems, comprising:
   measuring an output of a subset of PV energy systems, each of the subset of PV energy systems including a corresponding current sensor, and a remainder of the PV energy systems includes PV energy systems without current sensors;
   calculating a total power of all of the PV energy systems based on the measured output of the subset of PV energy systems;
   determining a charging threshold for one or more storage systems;
   determining a power threshold of one or more IT clusters within a data center; and
   selectively utilizing energy from the plurality of PV energy systems to charge the one or more storage systems or power the one or more IT clusters.

2. The method of claim 1, wherein the PV energy systems without current sensors include a same type of PV cell as the subset of PV energy systems, and calculating the total power includes applying a power level of each of the subset of PV energy systems to each of the PV energy systems without current sensors.

3. The method of claim 1, wherein the PV energy systems without current sensors include a same type of PV cell as the subset of PV energy systems, and calculating the total power includes multiplying by a ratio which is proportional to a number of panels of the PV energy systems without current sensors divided by a number of panels of the subset of PV energy systems.

4. The method of claim 1, wherein calculating the total power comprises:
   calculating power levels for each of the PV energy systems without current sensors by numerically selecting weights for each of the PV energy systems without current sensors.

5. The method of claim 4, wherein calculating the total power further comprises:
   removing power level calculations corresponding to highest and lowest values from each of the selected weights for each of the PV energy systems without current sensors; and
   calculating an average value of remaining power level calculations.

6. The method of claim 1, wherein calculating the total power comprises:
   utilizing a machine learning (ML) neural network to calculate a predicted output power of the PV energy systems without current sensors; and
   calculating the total power based on the predicted output power calculated using the ML neural network.

7. The method of claim 1, wherein the total power is above the charging threshold for one or more storage systems and below the power threshold of one or more IT clusters, and energy from the plurality of PV energy systems is used to charge the one or more storage systems.

8. The method of claim 1, wherein the total power is above the charging threshold for one or more storage systems and above the power threshold of one or more IT clusters, and energy from the plurality of PV energy systems is used to power the one or more IT clusters.

9. A data center system, comprising:
   a plurality of photovoltaic (PV) energy systems;
   a subset of the plurality of PV energy systems each including a corresponding current sensor, where a remainder of the PV energy systems includes PV energy systems without current sensors;

one or more storage systems;
one or more IT clusters; and
at least one power controller configured to:
   measure an output of the subset of PV energy systems including current sensors;
   calculate a total power of all of the plurality of PV energy systems based on the measured output of the subset of PV energy systems;
   determine a charging threshold for the one or more storage systems;
   determining a power threshold of the one or more IT clusters; and
   selectively utilize energy from the plurality of PV energy systems to charge the one or more storage systems or power the one or more IT clusters.

10. The system of claim 9, wherein the PV energy systems without current sensors include a same type of PV cell as the subset of PV energy systems, and the at least one power controller is configured to calculate the total power by applying a power level of each of the subset of PV energy systems to each of the PV energy systems without current sensors.

11. The system of claim 9, wherein the PV energy systems without current sensors include a same type of PV cell as the subset of PV energy systems, and the at least one power controller is configured to calculate the total power by multiplying by a ratio which is proportional to a number of panels of the PV systems without current sensors divided by a number of panels of the subset of PV energy systems.

12. The system of claim 9, wherein the power controller is further configured to:
   receive one or more additional PV energy systems without current sensors; and
   manage and operate all the PV energy systems in different modes of operations, the modes of operation including a disconnected mode, a charging mode for charging the one or more storage systems, and a connected mode for powering the one or more IT clusters.

13. The system of claim 9, wherein calculating the total power comprises:
   utilizing a machine learning (ML) neural network to calculate a predicted output power of the PV energy systems without current sensors; and
   calculating the total power based on the predicted output power calculated using the ML neural network.

14. The system of claim 9, wherein the total power is above the charging threshold for one or more storage systems and below the power threshold of one or more IT clusters, and energy from the plurality of PV energy systems is used to charge the one or more storage systems.

15. The system of claim 9, wherein the total power is above the charging threshold for one or more storage systems and above the power threshold of one or more IT clusters, and energy from the plurality of PV energy systems is used to power the one or more IT clusters.

16. A method for integrating photovoltaic (PV) power systems within a data center, the method comprising:
   adding at least one new PV energy system to the data center, the new PV energy systems not including current sensors;
   determining whether the at least one new PV energy system includes a same type of PV cell as previously installed PV energy systems;
   if the at least one new PV energy system includes the same type of PV cell as the previously installed PV energy systems, calculating a total power of all PV energy systems by applying a power level of each of the previously installed PV energy systems to each of the new PV energy systems; and
   if the at least one new PV energy system does not include the same type of PV cell as the previously installed PV energy systems, calculating the total power of all PV energy systems by multiplying by a ratio which is proportional to a number of panels of the new PV energy systems divided by a number of panels of the previously installed PV energy systems.

17. The method of claim 16, wherein the at least one new PV energy system does not include the same type of PV cell as the previously installed energy systems, and calculating the total power comprises:
   calculating power levels for each of the at least one new PV systems without current sensors by numerically selecting weights for each of the at least one new PV systems without current sensors.

18. The method of claim 17, wherein calculating the total power further comprises:
   removing power level calculations corresponding to highest and lowest values from each of the numerically selected weights for each of the at least one new PV systems; and
   calculating an average value of remaining power level calculations.

19. The method of claim 16, wherein the total power is above a charging threshold for one or more storage systems and below a power threshold of one or more IT clusters, and energy from the all PV energy systems is used to charge the one or more storage systems.

20. The method of claim 16, wherein the total power is above a charging threshold for one or more storage systems and above a power threshold of one or more IT clusters, and energy from all PV energy systems is used to power the one or more IT clusters.

* * * * *